United States Patent [19]
Schwarz

[11] Patent Number: 5,566,525
[45] Date of Patent: Oct. 22, 1996

[54] METHOD OF ERECTING WALLS, AND FORM ELEMENTS THEREFOR

[75] Inventor: Alois Schwarz, Kirchdorf I/T, Austria

[73] Assignee: C. M. E. Schwarz Holding-Gesellschaft m.b.H., Kirchdorf in Tirol, Austria

[21] Appl. No.: 344,480

[22] Filed: Nov. 23, 1994

[30] Foreign Application Priority Data

Nov. 23, 1993 [AT] Austria ..................... 2371/93

[51] Int. Cl.⁶ ..................................... F04C 1/00
[52] U.S. Cl. ............... 52/745.09; 52/747.1; 52/309.16; 52/309.9; 52/405.1; 52/405.3; 52/220.2; 52/438
[58] Field of Search ............ 126/633; 52/405.1, 52/405.2, 405.3, 405.4, 220.2, 424, 425, 438, 442, 439, 309.9, 309.12, 309.14, 309.17, 309.16, 745.09, 747.1

[56] References Cited

U.S. PATENT DOCUMENTS

| | | | |
|---|---|---|---|
| 3,858,376 | 1/1975 | Moore | 52/745.09 |
| 4,144,931 | 3/1979 | Medico, Jr. | 126/633 X |
| 4,306,395 | 12/1981 | Carpenter | 52/309.12 X |
| 4,436,084 | 3/1984 | Carlston et al. | 126/633 X |
| 4,532,745 | 8/1985 | Kinard | 52/309.12 X |
| 4,986,049 | 1/1991 | Kennedy et al. | 52/309.12 |
| 5,024,035 | 6/1991 | Hanson et al. | 52/309.12 X |
| 5,062,244 | 11/1991 | Ducharme | 52/309.12 X |
| 5,313,753 | 5/1994 | Sanger | 52/309.12 X |
| 5,339,592 | 8/1994 | Schmid | 52/309.12 X |
| 5,440,846 | 8/1995 | Record | 52/309.17 X |

*Primary Examiner*—Wynn E. Wood
*Attorney, Agent, or Firm*—Herbert L. Lerner; Laurence A. Greenberg; Werner H. Stemer

[57] ABSTRACT

Method for erecting walls, in particular exterior walls, of a building, by means of form elements with insulating inlays. The interior of the form blocks or of form elements is thereby divided in the longitudinal direction of the walls into two regions by a layer of heat-insulating material. A layer of readily heat-conducting material is inserted in the region towards the exterior surface of the wall and a layer of heat-retaining material is inserted in the region towards the interior of the wall. A pipe is disposed in the layer of heat-retaining material for conducting a carrier medium for selectively heating and cooling. Another pipe may be placed in the layer of heat-conducting material.

8 Claims, 2 Drawing Sheets

METHOD OF ERECTING WALLS, AND FORM ELEMENTS THEREFOR

BACKGROUND OF THE INVENTION

Field of the Invention

The invention relates to a method for erecting walls, in particular exterior walls of buildings, by means of form elements which are formed with insulation inserts, and to a component for producing the walls of a building.

The present invention is based on the premise that heat and cooling medium collected in an environmental collector can be utilized in conditioning rooms disposed in buildings, inasmuch as the carrier medium of the environmental collector is used for heating or cooling the walls of the building. It must thereby be taken into consideration that the temperature prevailing in the rooms of buildings is to be maintained at a constant value of approximately from 22° C. to 25° C., while the ambient temperature outside the building is subject to wide fluctuations, which, in addition, may take place within short periods of time.

SUMMARY OF THE INVENTION

It is accordingly an object of the invention to provide a method of erecting walls, and form elements therefor, which overcomes the hereinafore-mentioned disadvantages of the heretofore-known devices of this general type and which walls allow the building to be heated or cooled in cooperation with an environmental collector.

With the foregoing and other objects in view there is provided, in accordance with the invention, a method for erecting walls of a building, which comprises:

providing form elements with insulating inlays for a wall of a building, dividing the form elements in a longitudinal direction of the wall to be built by means of an insulating layer of a heat-insulating material into an outer region towards an exterior surface of the wall and an inner region towards an interior surface of the wall;

inserting a heat-conducting layer of readily heat-conducting material in the outer region defined in the form element;

inserting a heat-retaining layer of heat-retaining material in the inner region region defined in the form element;

inserting a pipe into the heat-retaining layer for conducting a carrier medium for heating and cooling the wall; and joining the form elements together for erecting the walls of the building.

In other words, the interior of the form blocks is divided into two regions by means of a layer of a heat-insulating material extending in the longitudinal direction of the walls. The layer of readily heat-conducting material is provided in the region towards the exterior wall surface (the outer region), and a layer of heat-retaining material is provided in the region towards the interior surface of the wall (the inner region). A pipe is inserted in at least the layer of heat-retaining material. The pipe conducts the carrier medium for selectively heating and cooling.

A pipe for conducting the carrier medium for heating or cooling is preferably also installed in the layer of readily heat-conducting material. The region of the wall facing the room is brought to the desired room temperature by means of the carrier medium which flows through those pipes which are located in the layer of heat-retaining material. Due to the heat-retaining properties of that layer, the desired temperature level is maintained at a largely constant value.

In contrast, the carrier medium flowing in those pipes which are disposed in the layer of highly heat-conducting material, cause a quick heating or a quick cooling of the outer region of the wall, depending on the quickly changing outside temperatures, so as to be able to maintain the desired room temperature. The transfer of the outside temperature into the rooms is hindered with the insulating layer disposed between these two layers.

The layer of readily heat-conducting material is preferably formed as a static support layer, i.e. a structural support. Further, that layer is preferably provided with a supplement of heat-conducting material, as for instance metallic powder.

In contrast, the layer of heat-retaining material is preferably formed of clay, mud, light concrete, or the like. The layer of heat-insulating material may be formed of mineral wool, glass wool, slag wool, cork, or the like.

In a preferred embodiment, the layer of heat-retaining material has a thickness which is about twice that of the layer of readily heat-conducting material and of the layer of insulating material.

With the foregoing and other objects in view there is also provided, in accordance with the invention, a form block element for walls of a building, comprising: a form block defining longitudinal walls with an exterior surface and an interior surface, respectively, and transverse walls extending between the longitudinal walls, the longitudinal walls and the transverse walls defining an interior space of the form block; an insulating layer formed of heat-insulating material disposed in the interior space and extending substantially parallel to the longitudinal walls, the insulating layer dividing the form block into an outer region facing towards the exterior surface and an inner region facing towards the interior surface; a heat-conducting layer of readily heat-conducting material disposed in the outer region; a heat-retaining layer of heat-retaining material disposed in the inner region; and the transverse walls each having an opening formed therein for receiving a pipe, and a pipe extending through the opening and along the heat-retaining layer for conducting a carrier medium for selectively heating and cooling the wall.

Again in other words, a component for use with the method as outlined above may be formed as a (concrete) form block with at least one opening formed at each transverse wall thereof for receiving a pipe. It is furthermore preferably provided at its interior wall with two mutually opposite grooves as seen in its longitudinal direction, in which grooves a plate of heat-insulating material is attachable. Such a component element is built, in particular, of insulating material such as wood fiber, straw, or the like.

In accordance with another feature of the invention, the form block element further comprises two grooves formed on an interior surface of each of the transverse walls and disposed opposite one another in a longitudinal direction of the form block, the grooves being adapted to receive and retain the insulating layer in the form of a plate of heat-insulating material.

In accordance with an added feature of the invention, the form block is essentially formed of insulating material, preferably of mineralized wood fiber or straw.

With the objects of the invention in view there yet again provided, in accordance with the invention, a form element for erecting walls of a building, comprising: a first plate defining an exterior surface of a wall of a building, a second plate defining an interior surface of the wall extending substantially parallel to the first plate, the plates defining an interior space therebetween, cross-bars extending in the interior space between the first and second plates, the cross-bars being articulated at the plates in a hinge-like fashion; an insulating layer formed of heat-insulating material disposed in the interior space and extending substantially parallel to the longitudinal walls, the insulating layer dividing the interior space into an outer region towards the first plate and an inner region towards the second plate; a heat-conducting layer of readily heat-conducting material disposed in the outer region; and a heat-retaining layer of heat-retaining material disposed in the inner region.

As above, a pipe is provided, in accordance with a further feature of the invention, which extends along the heat-retaining layer for conducting a carrier medium for selectively heating and cooling the wall.

In accordance with a further feature of the invention, the insulating layer is formed as a plate insert, and the element further comprises groove bars disposed on the cross-bars for retaining the plate insert.

With the objects of the invention in view, there is finally provided, an exterior wall of a building, comprising a heat-conducting layer formed of readily heat-conducting material oriented substantially parallel to an exterior wall surface of a building, an insulating layer formed of insulating material disposed adjacent the conducting layer, and a heat-retaining layer formed of heat-retaining material disposed adjacent the insulating layer, and pipes extending in the heat-conducting layer for a carrier medium for selectively heating and cooling the wall.

In accordance with a concomitant feature of the invention, a pipe for the carrier medium extends in the heat-retaining layer.

Other features which are considered as characteristic for the invention are set forth in the appended claims.

Although the invention is illustrated and described herein as embodied in a method of erecting walls, and form elements therefor, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Figure 1:
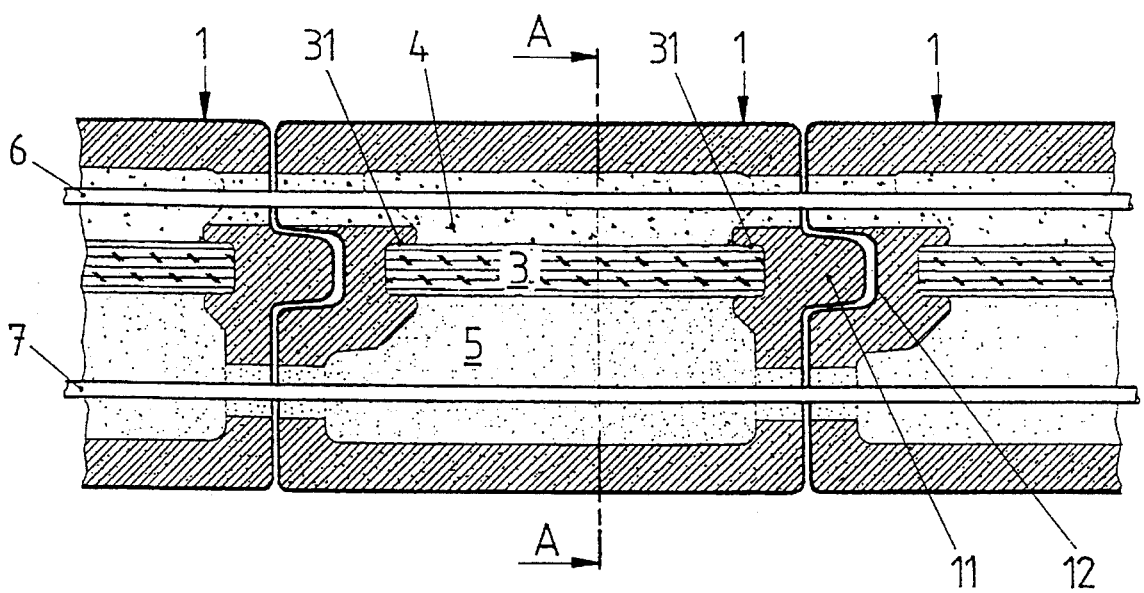
FIG. 1 is a partial plan view of a wall erected in accordance with the invention.

Referring now to the figures of the drawing in detail and first, particularly, to FIG. 1 thereof, there is seen a portion of a wall of a building which is erected by joining form blocks 1, one adjacent to the other. The form blocks 1 are preferably provided, at the external surfaces of the transverse walls, with a tongue 11 and a corresponding groove 12. The interior of the form blocks 1 is divided into two regions (an outer region on the side of the exterior wall surface and an inner region on the side of the interior wall surface) by means of a plate 3 of insulating material. The plate 3 is inserted in two grooves 31 provided at the inner surfaces of the transverse walls.

A layer 4 of readily heat-conducting material is placed in the outer region (facing towards the exterior surface of the wall). A layer 5 of heat-retaining material is placed in the inner region (facing the interior surface). Pipes 6 and 7 are placed at the top of these layers, which pipes can be supplied with a carrier medium for supplying or removing heat (heating or cooling).

The form blocks 1 are preferably formed from cement-glued or plastic glued mineralized excelsior (wood fiber), from straw, or from another insulating material.

The layer 3 consists of a plate of glass wool, mineral wool, slag wool, cork, or the like.

The layer 4, which is a static support layer, is formed of concrete with supplements serving to increase its heat conductivity, such as metal powder.

The layer 5 consists of clay, mud, or concrete with heat-storing or heat-retaining supplements.

A carrier medium from an environmental collector for heating or cooling is conducted through the pipe 6, whereby, depending on the prevailing outside temperatures, the region facing the exterior surface of the wall is either heated or cooled. Because the layer 4 is produced from a readily heat-conducting material, the temperature thereof can be quickly adjusted to the climatic conditions. In contrast, the carrier medium flowing through the pipes 7 brings the layer 5 near the temperature which is desired for the interior rooms. Because the layer 5 is produced from a material with good heat-retaining capacity, a uniform temperature level is assured.

Figure 2:
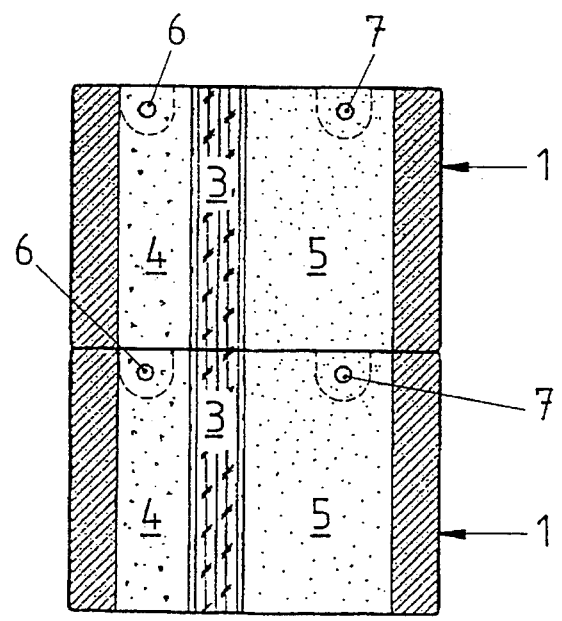
FIG. 2 is a sectional view of the wall, taken along the line A—A in FIG. 1.
Figure 3:
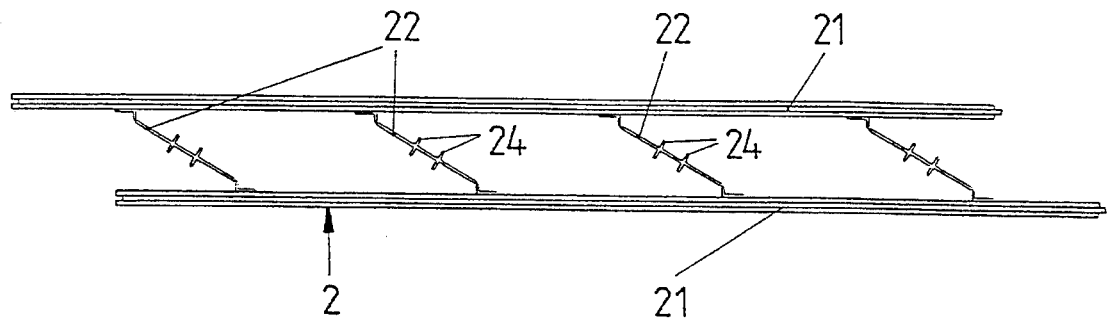
FIG. 3 is a partial top-plan view of a form element according to the invention, in a partly folded or collapsed condition.
Figure 4:
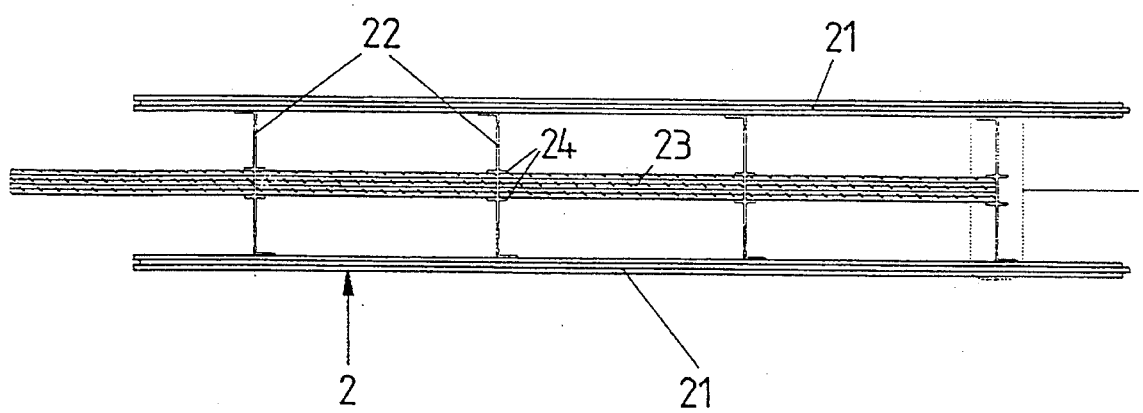
FIG. 4 is a similar view of the form element with a central insulating layer inserted therein.

With reference to FIGS. 3 and 4, the form element 2 consists of two plates 21 produced from insulating material. The two plates 21 are connected to one another via cross-bars 22 which are articulated thereon in a hinge-like manner. The cross-bars 22 are provided with a molding strip 24 or similar groove bar, into which plates 23 of insulating material are inserted. For the purpose of erecting a wall, layers of a readily heat-conducting material and of a heat-retaining material, respectively, are inserted into the spaces between the plates 21 and 23. Furthermore, pipes for conducting a carrier medium are laid in. Reference is had, in this context, to the above explanation with regard to the exemplary embodiment according to FIGS. 1 and 2.

The particular advantage of such form elements is found in the fact that they can be transported to the construction site in a folded, i.e. collapsed, condition. There they are provided with plates 23 by means of which they are held in a position necessary for receiving the filling with the other layers.

The method according to the invention is particularly suited for erecting exterior walls of buildings which are then heated or cooled by means of a carrier medium provided by an environmental collector. The method can, however, also be utilized in erecting interior walls. The present invention also pertains to the exterior walls of buildings which have the discussed structural configuration.

Environmental collectors which are suitable are solar energy collectors, heat collectors, earth reservoir heat pumps, or the like.

We claim:

1. A method for erecting walls of a building, which comprises:

joining form elements together and forming a row of a plurality of mutually adjacent form elements, inserting an insulating layer of a heat-insulating material into the form elements, the heat-insulating material dividing the form elements in a longitudinal direction of a wall into an outer region towards an exterior surface of the wall and an inner region towards an interior surface of the wall;

subsequently inserting a heat-conducting layer of readily heat-conducting material in the outer region defined in each form element of the row of form elements;

inserting a heat-retaining layer of heat-retaining material in the inner region defined in each form element of the row of form elements;

inserting a pipe into the heat-retaining layer for conducting a carrier medium for heating and cooling the wall; and repeating the foregoing steps by placing further rows on the row of form elements and erecting the walls of the building.

2. The method according to claim 1, which further comprises inserting a pipe for conducting a carrier medium for heating and cooling into the heat-conducting layer.

3. The method according to claim 1, which further comprises inserting the heat-conducting layer in the form of a static support layer.

4. The method according to claim 1, which further comprises inserting the heat-conducting layer in the form of a concrete layer with a supplement of heat-conducting material.

5. The method according to claim 4, which comprises providing the supplement of heat-conducting material in the form of a metal powder.

6. The method according to claim 1, which comprises forming the heat-retaining layer of a heat-retaining material selected from the group consisting of clay, mud, and light concrete.

7. The method according to claim 1, which comprises forming the heat-insulating layer of a heat-insulating material selected from the group consisting of mineral wool, glass wool, slag wool, and cork.

8. The method according to claim 1, which further comprises forming the heat-retaining layer with a thickness being approximately twice a thickness of the heat-insulating layer and of the heat-conducting layer.

* * * * *